United States Patent
Gunawan et al.

(10) Patent No.: US 10,564,303 B2
(45) Date of Patent: *Feb. 18, 2020

(54) PARALLEL DIPOLE LINE TRAP SEISMOMETER AND VIBRATION SENSOR

(71) Applicant: International Business Machines Corporation, Armonk, NY (US)

(72) Inventors: Oki Gunawan, Westwood, NJ (US); Yudistira Virgus, Williamsburg, VA (US)

(73) Assignee: International Business Machines Corporation, Armonk, NY (US)

( * ) Notice: Subject to any disclaimer, the term of this patent is extended or adjusted under 35 U.S.C. 154(b) by 572 days.

This patent is subject to a terminal disclaimer.

(21) Appl. No.: 15/219,725

(22) Filed: Jul. 26, 2016

(65) Prior Publication Data

US 2018/0031716 A1 Feb. 1, 2018

(51) Int. Cl.
*G01V 1/00* (2006.01)

(52) U.S. Cl.
CPC .............. *G01V 1/001* (2013.01); *G01V 1/008* (2013.01)

(58) Field of Classification Search
CPC . G01H 9/00; G01H 11/06; G01H 1/00; G01V 1/001; G01V 1/008; G01V 1/18; G01V 1/181; H01F 7/0247; H01F 7/0236; H01F 7/0231; H01F 7/02; H01F 7/202; H01F 7/0284; H01F 7/00; G01D 5/12; G01N 2291/02827
USPC ..................................... 73/654; 335/285–306
See application file for complete search history.

(56) References Cited

U.S. PATENT DOCUMENTS

| | | |
|---|---|---|
| 3,626,364 A | 12/1971 | Simon et al. |
| 5,565,665 A | 10/1996 | Biglari et al. |
| 5,638,340 A * | 6/1997 | Schiefele ............... G04B 17/02 368/179 |
| 6,832,518 B1 | 12/2004 | Berstis |
| 7,252,001 B2 | 8/2007 | Boletis et al. |
| 7,597,002 B2 | 10/2009 | Moser et al. |
| 7,859,157 B2 | 12/2010 | Baur |

(Continued)

FOREIGN PATENT DOCUMENTS

| | | |
|---|---|---|
| JP | 2013102257 A | 5/2013 |
| WO | WO2009073272 A2 | 6/2009 |

OTHER PUBLICATIONS

Cazacu et al., Vertical Diamagnetic Levitation Array With Extended Stability Area, 2006 (Year: 2006).*

(Continued)

*Primary Examiner* — John Fitzgerald
*Assistant Examiner* — Truong D Phan
(74) *Attorney, Agent, or Firm* — Vazken Alexanian; Michael J. Chang, LLC

(57) ABSTRACT

Parallel dipole line (PDL) trap seismometer and vibration sensors are provided. In one aspect of the invention, a seismometer is provided. The seismometer includes: at least one PDL trap having a pair of dipole line magnets, and a diamagnetic object levitating above the dipole line magnets; and a sensing system (passive or active sensing) for determining a position of the diamagnetic object relative to the dipole line magnets and to yield the seismic signal in terms of displacement or acceleration. Methods for sensing vibrations using the present PDL trap seismometer and vibration sensors are also provided.

8 Claims, 6 Drawing Sheets

(56) References Cited

U.S. PATENT DOCUMENTS

| | | | |
|---|---|---|---|
| 8,378,662 B2 | 2/2013 | Storkey | |
| 8,895,355 B2 | 11/2014 | Cao et al. | |
| 9,093,377 B2 | 7/2015 | Cao et al. | |
| 9,236,293 B2 | 1/2016 | Cao et al. | |
| 9,263,669 B2 | 2/2016 | Cao et al. | |
| 10,082,408 B2 * | 9/2018 | Gunawan | G01D 5/24 |
| 2010/0109643 A1 | 5/2010 | Storkey | |
| 2011/0018662 A1 | 1/2011 | Degen et al. | |
| 2014/0029005 A1 * | 1/2014 | Fiess | G01N 21/21 356/364 |
| 2014/0273449 A1 * | 9/2014 | Cao | H01L 21/02697 438/674 |

OTHER PUBLICATIONS

O. Gunawan et al., "A Diamagnetic Trap with 1D Camelback Potential," arXiv preprint, arXiv:1405.5220, May 2014 (5 pages).

E. Cazacu et al., "Vertical diamagnetic levitation array with extended stability area," Annals of University of Craiova, Electrical Engineering Series, vol. 30, Oct. 2006, pp. 12-15.

Merchant, "MEMS Applications in Seismology," Seismic Instrumentation Technology Symposium, Nov. 2009 (31 pages).

Gunawan et al., "A parallel dipole line system," Applied Physics Letters 106, pp. 062407-1-5 (Feb. 2015).

Gunawan et al., "Supplementary Materials: A parallel dipole line system," Applied Physics Letters 106 (Feb. 2015) (18 pages).

English Abstract of UA101509C2 by Borsuk Volodymyr Antonovych et al., Apr. 10, 2013 (1 page).

\* cited by examiner

Optical sensing

Video sensing
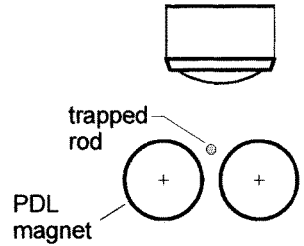 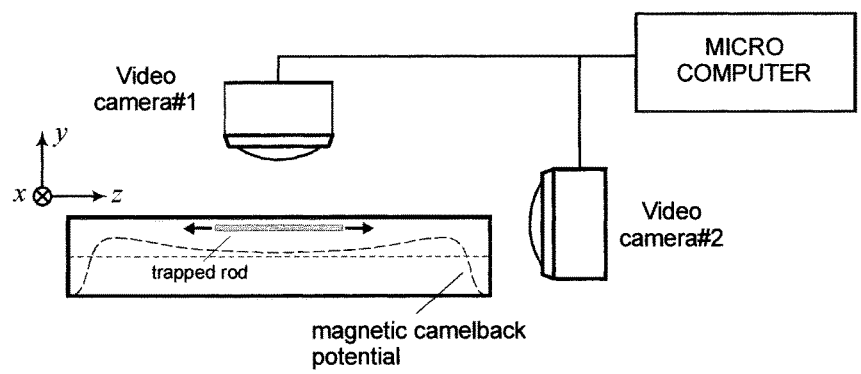
FIG. 5  FIG. 6
Capacitive sensing
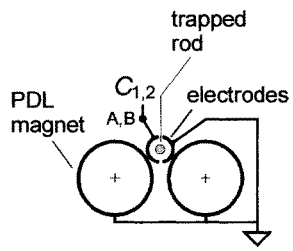 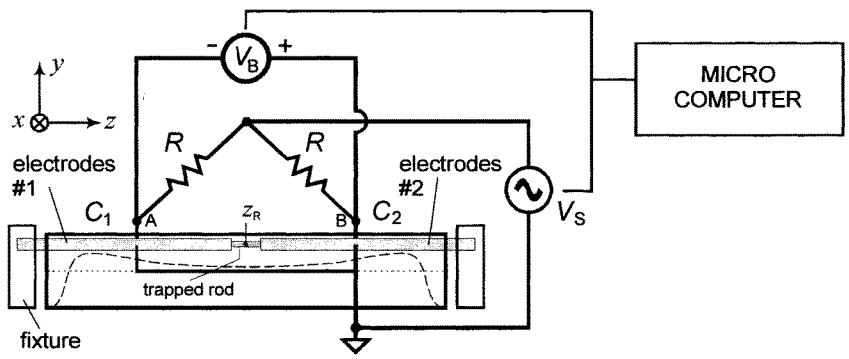
FIG. 7  FIG. 8

Force feedback sensing

Two-Axes System

Three-Axes System

*FIG.* 17
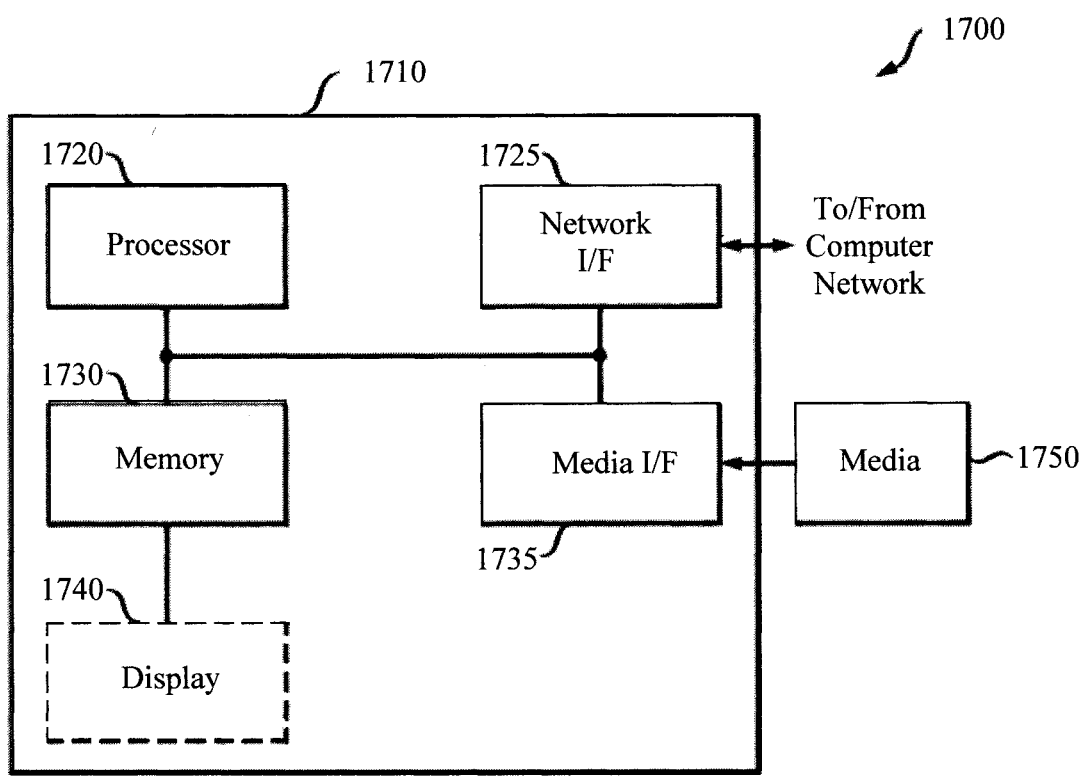

PARALLEL DIPOLE LINE TRAP SEISMOMETER AND VIBRATION SENSOR

FIELD OF THE INVENTION

The present invention relates to magnetic parallel dipole line (PDL) trap systems, and more particularly, to a PDL trap seismometer and vibration sensor.

BACKGROUND OF THE INVENTION

A seismometer is an instrument that measures the motion of the ground due to seismic activity generated by earthquakes, volcanic activities, or other sources. A seismometer can be used to map the interior of the earth and to measure the size and locations of these sources of seismic activity. In principle a seismometer is also a vibration sensor. Low cost and high sensitivity seismometers are in high demand for distributed sensing of seismic activity.

Various types of seismometers are available such as pendulum-based seismometers and accelerometers using piezoelectric or microelectromechanical (MEMS) sensors. Many of these seismometers are good for strong motion detection. However, low cost, weak motion detection sensors are still lacking. See, for example, Merchant, "MEMS Applications in Seismology," Seismic Instrumentation Technology Symposium, November 2009 (31 pages).

Thus, improved motion detector sensor designs would be desirable.

SUMMARY OF THE INVENTION

The present invention provides parallel dipole line (PDL) trap seismometer and vibration sensors and techniques for use thereof. In one aspect of the invention, a seismometer is provided. The seismometer includes: at least one parallel dipole line (PDL) trap having a pair of dipole line magnets, and a diamagnetic object levitating above the dipole line magnets; and a sensing system for determining a position of the diamagnetic object relative to the dipole line magnets.

In another aspect of the invention, a method for sensing vibrations is provided. The method includes: providing a seismometer including at least one PDL trap having a pair of dipole line magnets, and a diamagnetic object levitating above the dipole line magnets; and determining a position of the diamagnetic object relative to the dipole line magnets, wherein displacement of the diamagnetic object in the PDL trap corresponds to a magnitude of the vibrations.

A more complete understanding of the present invention, as well as further features and advantages of the present invention, will be obtained by reference to the following detailed description and drawings.

BRIEF DESCRIPTION OF THE DRAWINGS

FIG. 5 is a front view diagram of a video passive sensing scheme according to an embodiment of the present invention;

FIG. 6 is a side view diagram of the video passive sensing scheme according to an embodiment of the present invention;

FIG. 7 is a front view diagram of a passive capacitance sensing scheme according to an embodiment of the present invention;

FIG. 8 is a side view diagram of the passive capacitance scheme according to an embodiment of the present invention;

FIG. 17 is a diagram illustrating an exemplary apparatus for performing one or more of the methodologies presented herein according to an embodiment of the present invention.

DETAILED DESCRIPTION OF PREFERRED EMBODIMENTS

Provided herein are techniques for seismic sensing using magnetic parallel dipole line (PDL) trap systems. Advantageously, the use of a PDL trap-based design provides a low cost, and high sensitivity (i.e., able to detect weak seismic activity) seismometer sensor solution. Namely, the present seismometers/motion sensors can detect noise less than 1 ng/Hz$^{0.5}$, have a bandwidth of from about 0.1 Hertz (Hz) to about 10 Hz, a peak acceleration of less than about 0.25 g, (where g is the gravitational acceleration on the earth's surface) and a dynamic range of greater than about 120 decibels (dB), yet require less complicated and thus less costly components.

Figure 1:
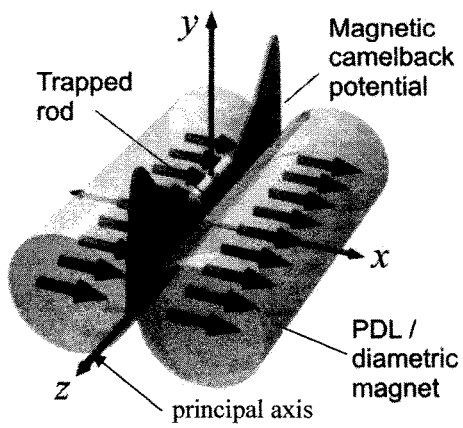
FIG. 1 is a diagram illustrating a magnetic parallel dipole line (PDL) trap system having a diamagnetic cylindrical object trapped using transversely magnetized (also called diametric) magnets according to an embodiment of the present invention.

A PDL trap enables trapping of a diamagnetic cylindrical object (i.e., "a trapped rod") using transversely magnetized (also called diametric) magnets that serve as the PDL system. See FIG. 1. The key feature of the trap is the "camelback magnetic potential" along the longitudinal (i.e., principal) axis that provides stable trapping. See, for example, Gunawan et al., "A parallel dipole line system," Applied Physics Letters 106, pp. 062407-1-5 (February 2015) (hereinafter "Gunawan"); and U.S. Pat. Nos. 8,895,355, 9,093,377, 9,236,293, and 9,263,669 all issued to Cao et al., entitled "Magnetic Trap for Cylindrical Diamagnetic Materials," the contents of each of which are incorporated by reference as if fully set forth herein. The "camelback magnetic potential" exists along the longitudinal (z-axis), i.e., magnetic field enhancement near the edge of the dipole line which occurs for diametric magnet with length exceeding the critical length $L_C$ where $L_C \sim 2.5a$ for a pair of cylindrical diametric magnet system, wherein a is the radius of the magnet.

The magnets in the PDL trap have an elongated shape such as a cylinder, bar, or stripe, whose magnetization is in the transverse direction (perpendicular to the long axis). These magnets will be referred to herein as "dipole line" or "diametric" magnets. The trapped object such as a graphite rod can be trapped at the center. The trapped object will levitate above the pair of diametric magnets. Since the trapped object is levitating, it is suspended in space and thus isolated from contact with the surrounding objects, allowing for very sensitive force detection.

Figure 2:
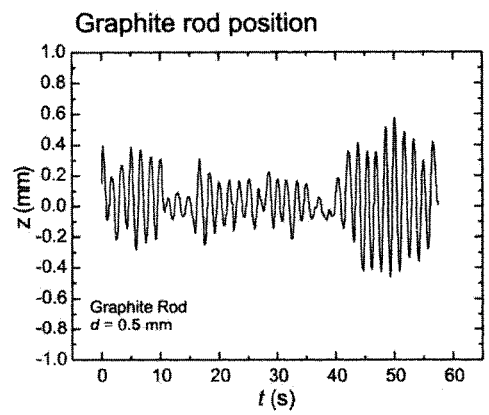
FIG. 2 is a diagram illustrating a seismic signal based on the relative movement of the trapped rod and PDL magnet base according to an embodiment of the present invention.

During operation, the PDL trap should be kept in a horizontal position so that the rod is trapped at the center. In the presence of ground vibration, the trapped rod tends to stay in a fixed position due to its inertia (while the vibrations move the magnet base). The relative movement between the trapped rod and PDL magnet base can be detected and measured as a seismic signal as shown in FIG. 2. FIG. 2 is a diagram illustrating the displacement z of the trapped rod relative to the PDL magnet base (measured in millimeters (mm)) as a function of time t (measured in seconds (s)).

The ground acceleration $a_G$ can be deduced by:

$$a_G = d^2z/dt^2 + b/m \times dz/dt + k/m \times z \qquad (1)$$

wherein z is the rod displacement, b is the drag coefficient of the rod due to the surrounding air, k is the camelback spring constant at the center of the PDL trap, and m is the mass of the rod.

One notable advantage of the present PDL trap-based seismometer system is that it is naturally a 1D oscillator, thus simplifying the design and minimizing interference with oscillation mode from other dimensions. As will be described in detail below, multiple axes seismic sensing can be easily implemented to detect vibrations in multiple directions.

Another notable advantage of the present PDL trap-based seismometer system is that it provides a high sensitivity, which can be tuned by varying the aspect ratio (i.e., length to radius or L/a where L is the length of the magnet) of the PDL magnets. This high sensitivity is due to the long oscillation period (T) of the trapped rod. For instance, a (long) period of T=3 seconds can easily be obtained for PDL traps with aspect ratio L/a=16 and magnet magnetization $M=10^6$ A/m. Increases in sensitivity can be attained by increasing the aspect ratio (L/a). Namely, a larger L/a stretches the "camelback potential" out wider, which results in a 'weaker' confining potential (i.e., this increases the spring constant $k_2'$ of the PDL trap). See, for example, FIG. 2 of Gunawan. Specifically, the sensitivity becomes better (smaller resolution) with longer magnets or wider camelback potential at higher aspect ratio (length/radius). Thus, the sensitivity of the present PDL trap seismometer can be increased by increasing the length (L) of the magnets relative to their radius (a).

Yet another advantage of the present PDL trap-based seismometer is that the damping factor can be easily tuned by choosing the diameter of the graphite rod. Namely, when the trapped rod is displaced, it tends to oscillate at the center of the trap. See, for example, Gunawan (FIG. 3a—which shows the rod oscillation on the 1D camelback potential extracted from video). However the oscillation is damped due to air friction. See, for example, U.S. patent application Ser. No. 14/826,934 by Gunawan et al., entitled "Parallel Dipole Line Trap Viscometer and Pressure Gauge" (hereinafter "U.S. patent application Ser. No. 14/826,934"), the contents of which are incorporated by reference as if fully set forth herein. As described in U.S. patent application Ser. No. 14/826,934, the damping is more severe (damping becomes stronger) as the diameter of the rod becomes smaller, i.e., the damping time constant τ decreases with smaller rod diameter. Conversely, τ increases (damping becomes weaker) with a larger diameter rod. The damping time constant τ also increases with a longer rod.

In other words the diameter and the length of the rod control the Q-factor of this oscillator, where:

$$Q = \pi \tau f_0, \qquad (2)$$

wherein τ is the damping time constant, and $f_0$ as the oscillation frequency. One can also increase the damping time constant and thus the Q by enclosing the trap in a vacuum enclosure. This will remove the viscous drag on the rod and eliminate damping.

As described above, readings involve measuring the movement of the PDL magnet base relative to the levitated, trapped rod. When the present seismometer is placed on a surface (such as the ground), the trapped rod tends to stay in a fixed position due to its inertia. Thus, when there is ground motion, the PDL magnet base will move (since it is in contact with the ground) relative to the (stationary) trapped object. In most cases to achieve higher sensitivity and to lower the noise floor of the seismic signal it is desirable to have a larger Q factor achieved by using larger diameter and longer diamagnetic rod and/or by adding a vacuum enclosure (see for example FIG. 15).

Two different types of seismic sensing schemes using the present PDL seismometer are presented herein. The first type is a passive sensing scheme in which motion of the PDL magnet base relative to the trapped rod is simply measured using, e.g., optical sensing, video sensing, capacitive sensing, etc. The observed rod displacement values can then be used to determine the magnitude of the seismic activity. The other type is an active sensing scheme which (passively) monitors the trapped rod and, when movement of the rod (relative to the PDL magnet base) is detected due, e.g., to ground motion, a counteracting force is (actively) applied to the rod to keep the rod stationary (i.e., to prevent movement of the rod relative to the PDL magnet base). The magnitude of the counteracting force or acceleration becomes the output seismic signal. These different types of sensing schemes will now be described in detail.

Figure 3:
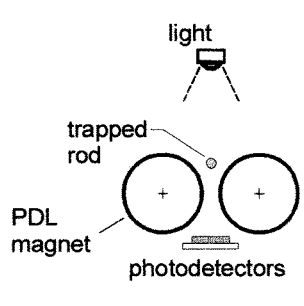
FIG. 3 is a front view diagram of an optical passive sensing scheme according to an embodiment of the present invention.
Figure 4:
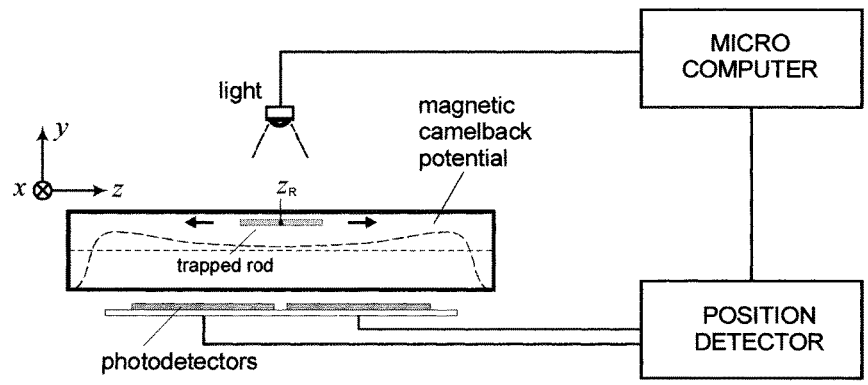
FIG. 4 is a side view diagram of the optical passive sensing scheme according to an embodiment of the present invention.

Passive sensing: In a first exemplary embodiment, an optical passive sensing scheme is employed as shown in FIG. 3 (front view) and FIG. 4 (side view). As shown in FIG. 3 and FIG. 4, an optical sensing scheme involves a light source on one (e.g., the top) side of the PDL trap, and differential photodetectors on the bottom side of the PDL trap below/opposite the light source, such that the trapped rod can pass between the light source and the photodetectors shadowing the latter. For instance, in the example shown in FIGS. 3 and 4, the light source is above the PDL trap and the photodetectors are below the PDL trap, however the present techniques can be implemented in the same manner described if the light source was below the trap and the photodetectors are above the trap. A suitable light source includes, but is not limited to, an incandescent light bulb, a light emitting diode and/or a laser, and suitable photodetectors include, but are not limited to, semiconductor photodetectors and/or light-dependent-resistors (LDRs).

As shown, e.g., in FIG. 3 it may be desirable to open a gap between the PDL magnets (i.e., the PDL magnets naturally join together, however a small gap can be opened between the magnets without dropping the trapped object) to provide a line of sight between the light source and the photodetector array. This gap can be created, e.g., using fixed spacers or fixed/variable mounting fixtures as described, for example, in U.S. patent application Ser. No. 15/131,566, entitled "Parallel Dipole Line Trap with Variable Gap and Tunable Trap Potential," the contents of which are incorporated by reference as if fully set forth herein.

As shown in FIG. 4, when the object moves relative to the PDL magnet base it passes between the light source and the photodetectors. If the object moves to the left side of the trap it will block light from the source from reaching the photodetector(s) on the left side of the trap, while light from the source will reach the photodetectors on the right side of the trap. When the object moves to the right side of the trap it will block light from the source from reaching the photodetectors on the right side of the trap, while light from the source will reach the photodetectors on the left side of the trap.

This interruption of otherwise constant illumination by movement of the trapped rod will result in a differential photocurrent signal from the photodetectors. As shown in FIG. 4, a Position Detector circuit can be employed to receive this signal from the photodetectors and feed the signal data to a Microcomputer which calculates the displacement of the rod in the PDL trap. According to an exemplary embodiment, the Position Detector circuit consists of a differential operational or instrumentation amplifier.

This passive optical sensing scheme is advantageous because it is both low-cost and provides a fast response time (e.g., up to a 1 megahertz bandwidth). While this passive optical sensing scheme accurately detects horizontal motion of the rod, seismic activity can include a vertical motion component as well. Techniques for sensing vertical motion are described below.

In another exemplary embodiment, a video-based passive sensing scheme is employed as shown in FIG. 5 (front view) and FIG. 6 (side view). As shown in FIG. 5 and FIG. 6, at least one digital video camera is positioned (e.g., above and/or adjacent to the trap) to capture digital video images of motion of the rod relative to the PDL magnet base. It is notable that the video camera(s) is/are mounted on the same chassis as the PDL trap magnets so that the position of the video camera(s) and the PDL trap magnets are fixed relative to one another. In the example shown in FIG. 6, the digital video camera will relay the images of the PDL trap/rod to a microcomputer, where the image data is analyzed to detect the position of the rod in the trap over time using a computer vision program. For instance, as detailed in U.S. patent application Ser. No. 14/826,934, the pixels in a digital camera collect photons which are converted into an electrical charge that represents intensity. During the image analysis, the intensity of the image pixels can be measured from each video frame or linescan, e.g., a linescan along the longitudinal axis of the rod. By way of example only, the position of the rod in the trap can be determined by choosing a certain intensity value that marks the edge of the rod called "edge threshold." See for example Gunawan (Supplementary Material A.2).

Optionally, as shown in FIG. 6, multiple video cameras can be employed which enables the detection of movement of the rod in more than one dimension. Namely, when there is ground motion, the trapped rod may move (relative to the PDL magnet base) along both the y (vertical) and z (horizontal) directions (see FIG. 6), i.e., seismic activity might involve both lateral ground shifting and up and down motion. A video camera positioned above the trap (video camera #1) captures rod movement along the horizontal (z) direction. However, in order to capture movement of the rod along the vertical (y) direction, a second video camera can be employed which is positioned adjacent to a side of the trap (video camera #2). This video camera #2 captures any up and down movement of the rod relative to the PDL magnet base. Thus, according to this exemplary embodiment, the present techniques can be applied to detect motion in 2 dimensions (i.e., along the y and z directions).

In yet another exemplary embodiment, a passive capacitive sensing scheme is employed as shown in FIG. 7 (front view) and FIG. 8 (side view). As shown in FIG. 7 and FIG. 8, electrodes (electrodes#1 and electrodes#2) are cylindrical case electrodes consisting of a pair of half-cylindrical shells that are placed to enclose the rod without touching the rod. The case electrode shells are mounted on fixtures on both ends of the trap (see, e.g., FIG. 8). The rod remains levitating and can move freely along the longitudinal axis z without touching the electrode shells. See, for example, U.S. patent application Ser. No. 15/131,443 by Oki Gunawan, entitled "Voltage-Tunable 1D Electro-Magnet Potential and Probe System with Parallel Dipole Line Trap" (hereinafter "U.S. patent application Ser. No. 15/131,443"), the contents of which are incorporated by reference as if fully set forth herein. The electrodes are connected with two resistors (R). The resistors form a resistor-capacitor (RC) bridge with the electrodes. As is known in the art, a bridge circuit contains two circuit branches which are 'bridged' by a third branch containing a voltmeter $V_B$. As shown in FIG. 8, an alternating current (AC) voltage source ($V_S$) is connected to the RC bridge and to the PDL magnets. The RC network in each branch serves as a voltage divider. Thus, by measuring the differential voltage between the electrodes using $V_B$, one can measure the voltage imbalance in the bridge and thereby deduce the rod displacement. As shown in FIG. 8, this data is collected/analyzed by a microcomputer. Further details regarding detecting rod positioning using capacitive sensing are provided in U.S. patent application Ser. No. 15/131,443.

In general, with capacitive sensing the rod's position in the PDL trap is determined based on a change in the capacitance as the rod passes between the electrode and the magnets. Using the system shown in FIGS. 7 and 8 as an example, as the rod moves in the trap it changes the capacitance of the system (i.e., the capacitance of the system changes (e.g., increases) when the rod (a conductor) enters between the electrodes and the magnets). Accordingly, the position of the rod (z) can be determined from voltage $V_B$ read out from the system.

Active sensing: As described in U.S. patent application Ser. No. 15/131,443, the position of the rod in the trap can be manipulated using an electrode(s) positioned over the PDL trap. Namely, if a direct current (DC) bias voltage $V_S$ is applied to the magnets and the electrode, then the rod will be drawn toward the electrode (with the applied voltage). This concept can be leveraged in accordance with the present techniques to provide an active sensing scheme where, instead of merely (passively) monitoring the position of the rod, a counteracting force is applied to the rod to keep it stationary. The magnitude of the counteracting force needed to keep the rod stationary can then be used to assess the magnitude of the ground motion (i.e., a greater counteracting force will be needed with increasing ground motion). Thus, rather than applying a bias voltage $V_S$ to actuate the rod, the applied bias voltage is used to counteract motion of the rod and to keep the rod stationary with respect to the trap or the magnet.

Figure 9:
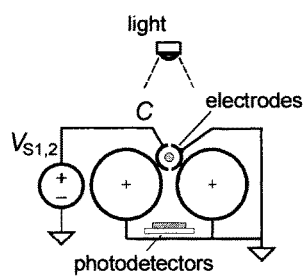
FIG. 9 is a front view diagram of an active (force feedback sensing) scheme according to an embodiment of the present invention.
Figure 10:
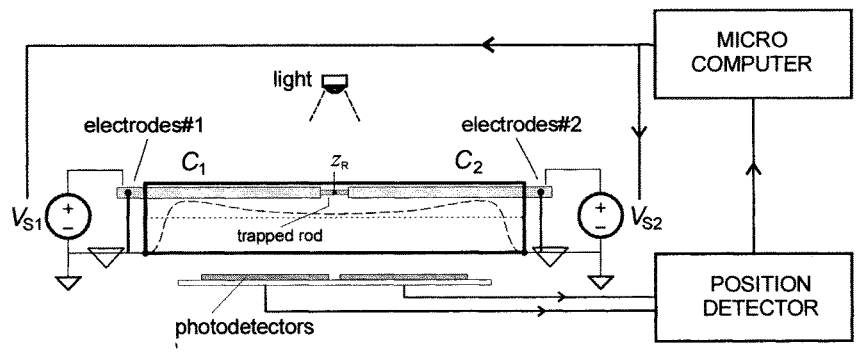
FIG. 10 is a side view diagram of the active (force feedback sensing) scheme according to an embodiment of the present invention.

An active (force feedback sensing) scheme is shown in FIG. 9 (front view) and FIG. 10 (side view). As shown in FIG. 9 and FIG. 10, two sets of cylindrical case electrodes (electrodes#1 and electrodes#2), each set having shell electrodes that are positioned enclosing but not touching the rod. Electrodes#1 and electrodes#2 are each connected to an independent DC voltage source (i.e., $V_{S1}$ and $V_{S2}$, respectively) controlled by a microcomputer. The electrodes (electrodes#1 and electrodes#2) can be biased by a DC voltage that will exert force on the trapped rod. According to an exemplary embodiment, the optical sensing scheme (as described in conjunction with the description of FIG. 3 and FIG. 4, above) is used to detect the position or the motion of the rod. As shown in FIG. 9, the electrode shells have an opening gap at the center that allows the light to pass therethrough to the differential photodetectors, thus allowing the rod motion to be detected.

In the presence of ground vibration, the system detects the movement and an electronic feedback system will energize the two electrodes that apply counter-acting force so that the rod becomes stationary. A microcomputer collects the video data and regulates $V_{S1}$ and $V_{S2}$ to keep the rod stationary relative to the magnet base. A well known proportional-integral-differential (PID) control scheme can be used wherein by adjusting the P, I and D gain parameters one can optimize the performance or response time of the system.

Figure 11:
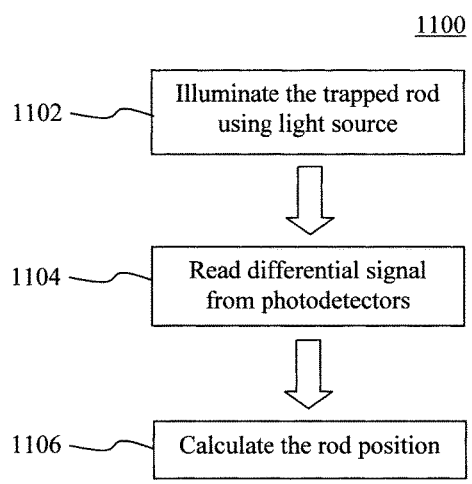
FIG. 11 is a diagram illustrating an exemplary methodology for vibration sensing using the present PDL trap-based seismometer and an optical sensing scheme according to an embodiment of the present invention.

Use of the present passive and active sensing schemes for vibration detection is now described by way of reference to FIGS. 11-14. For example, FIG. 11 provides an exemplary methodology 1100 for vibration sensing using an optical sensing scheme (as described in accordance with the description of FIGS. 3 and 4, above). As detailed above, an optical sensing scheme involves a light source and photodetectors located on opposite sides of the PDL trap such that the trapped rod can pass therebetween.

In step 1102, the light source illuminates the trapped rod. When the trapped rod is stationary, the photodetectors will receive constant illumination. However upon movement of the trapped rod relative to the PDL magnet base, there will be a differential photocurrent signal from the photodetectors, which is read in step 1104. Namely, as the moving rod passes between the light source and the photodetectors, the photocurrent signal changes, i.e., from full illumination to partial or full occlusion (from the moving rod). The photocurrent signal is used in step 1106 to calculate the displacement of the rod relative to the PDL magnet base which equates with a magnitude of the vibrations (i.e., vibrations of a greater magnitude result in a greater displacement of the rod). Basically, since the photodetectors are at fixed points along the horizontal axis of the PDL magnet base, then those photodetectors registering a differential photocurrent signal can be used to assess the exact movement of the rod relative to the base.

Figure 12:
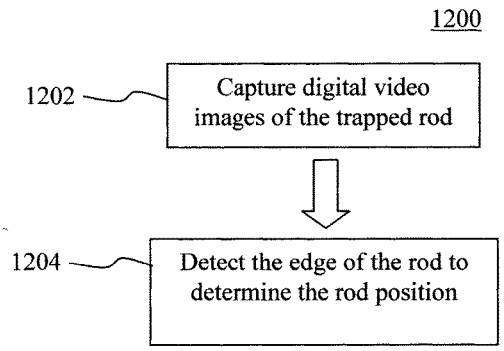
FIG. 12 is a diagram illustrating an exemplary methodology for vibration sensing using the present PDL trap-based seismometer and a video sensing scheme according to an embodiment of the present invention.

FIG. 12 provides an exemplary methodology 1200 for vibration sensing using a video sensing scheme (as described in accordance with the description of FIGS. 5 and 6, above). As detailed above, a video sensing scheme involves capturing digital video images of the rod in the trap using at least one video camera. Optionally, multiple video cameras can be employed to analyze movement of the rod in multiple (e.g., vertical and horizontal) directions.

In step 1202, digital video images of the trapped rod are captured by the video camera(s). In step 1204, the digital video images are analyzed using a computer vision program (see above), to detect a position of the rod (relative to the magnet base) as a function of time. As provided above, the position of the trapped rod can be captured both in the horizontal and vertical directions using digital video images from the (multiple) cameras.

Figure 13:
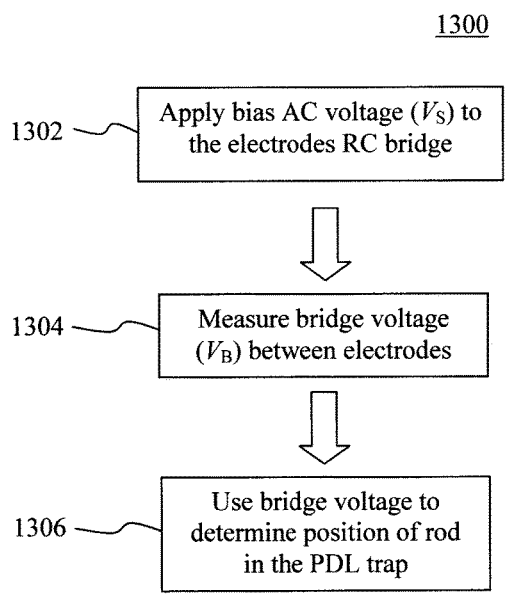
FIG. 13 is a diagram illustrating an exemplary methodology for vibration sensing using the present PDL trap-based seismometer and a capacitive sensing scheme according to an embodiment of the present invention.

FIG. 13 provides an exemplary methodology 1300 for vibration sensing using a capacitive sensing scheme (as described in accordance with the description of FIGS. 7 and 8, above). As detailed above, a capacitive sensing scheme utilizes electrodes above the trap that are connected with two resistors, an AC voltage source, and an AC volt meter.

In step 1302, a bias voltage is applied (via the voltage source $V_S$ and RC bridge) to the electrodes and to the PDL magnets. In step 1304, a differential (or bridge) voltage $V_B$ between the electrodes is measured (via the AC volt meter). In step 1306, this bridge voltage $V_B$ signal is used to determine the position of the rod relative to the PDL magnet base. See, for example, Equation 8 of U.S. patent application Ser. No. 15/131,443.

Figure 14:
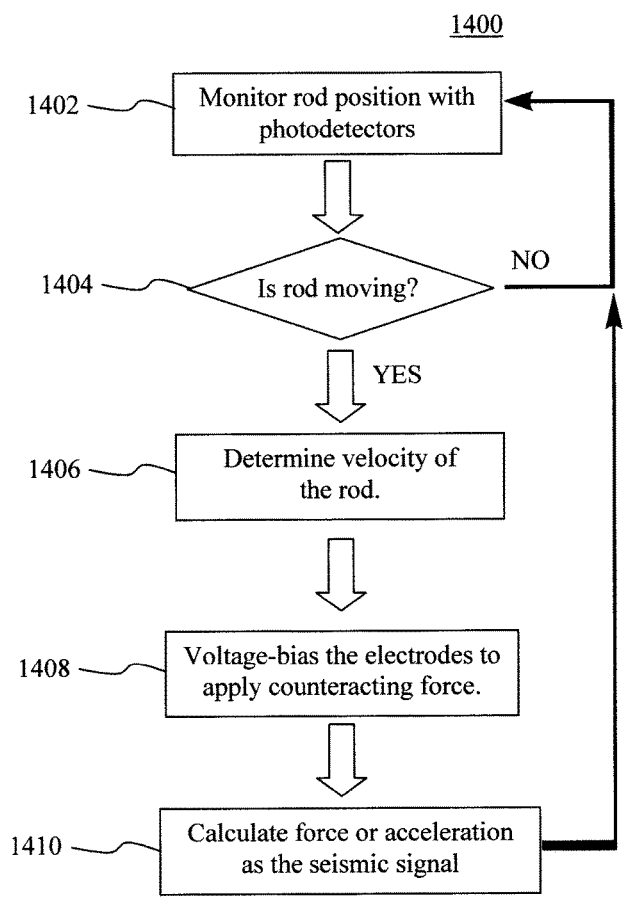
FIG. 14 is a diagram illustrating an exemplary methodology for vibration sensing using the present PDL trap-based seismometer and an active sensing scheme according to an embodiment of the present invention.

FIG. 14 provides an exemplary methodology 1400 for vibration sensing using an active sensing scheme (as described in accordance with the description of FIGS. 9 and 10, above). As detailed above, an active sensing scheme utilizes the ability to manipulate the position of the trapped rod by applying a biased direct current (DC) voltage to electrodes placed above the trap. More specifically, the electrodes will be used to impart a counteracting force on the rod to keep the rod stationary when vibrations (e.g., due to seismic activity) are occurring. The magnitude of the counteracting force necessary to keep the rod stationary is proportional to the magnitude of the ground motion.

In step 1402, the PDL trap is monitored to detect motion of the rod. According to an exemplary embodiment, a passive optical sensing scheme is employed in step 1402. Namely, a light source is positioned above the trap to illuminate the rod. The rod's shadow will be cast onto the differential photodetectors underneath, and the photocurrent signal can be analyzed to determine the position of the rod as a function of time. In step 1404, a determination is made as to whether the rod is moving relative to the trap. Basically, any vibration (e.g., seismic activity) will cause the PDL magnet base to move relative to the rod (which is stationary due to its inertia). The photodetectors will pick up this motion.

If it is determined in step 1404 that (NO) the trapped rod is not moving, then the process continues to monitor the rod in real time. On the other hand, if it determined in step 1404 that (YES) the trapped rod is moving, i.e., the position of the rod in the PDL trap is changing, then the electrodes are energized (i.e., a bias voltage is applied to the electrodes 1 & 2 via the independent voltage sources $V_{S1}$ and $V_{S2}$, respectively) as a counteracting force against the movement.

This counteracting force is applied and regulated as a feedback loop based on the position of the rod in the PDL trap (as determined, for example, using the passive optical sensing scheme). Namely, in step 1406, velocity of the rod is calculated from the differential photodetector signal (i.e., the differential photodetector signal primarily yields the rod position, and the velocity information can be obtained via differential computation), and in step 1408 a bias voltage is applied to the respective electrode as a counteracting force to stop movement of the rod. So, for instance, if the rod is moving to the right side of the trap, then applying a bias voltage to the left side electrode (electrode #1 in the example above) will counteract this motion by applying a force that wants to draw the rod back toward the left electrode. In the same manner, vibrations that move the rod to the left side of the trap can be counteracted by applying a bias voltage to the right side electrode (electrode #2 in the example above) which will want to draw the rod toward the right side electrode. Seismic activity can affect the rod motion in multiple directions. For example, ground shaking can move the rod back and forth relative to the magnet base. Thus, the present feedback system to gauge the position of the rod and apply the counteracting force is performed in an iterative manner as shown in FIG. 14. In step 1410, the force that is applied in this process is calculated as the seismic signal. The force F is related to the applied bias given as:

$$F = -\frac{1}{2} V^2 \partial C(z)/\partial z, \quad (2)$$

where V is the applied voltage, and C(z) is the capacitance of the electrodes under bias as a function of rod position.

Figure 15:
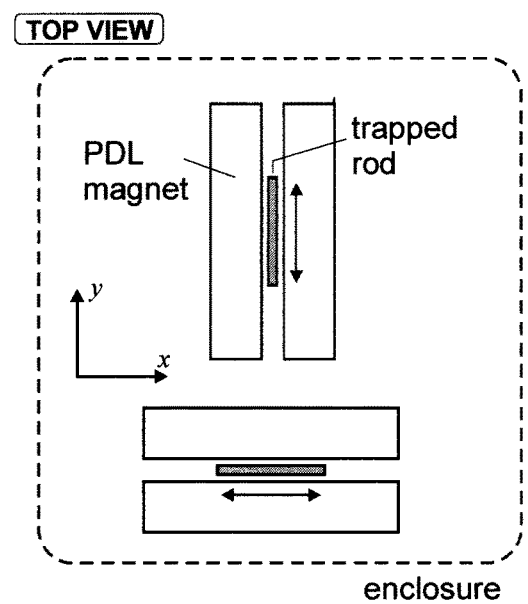
FIG. 15 is a top view diagram illustrating an exemplary two-axes system for detecting a seismic signal in multiple directions according to an embodiment of the present invention.

With the seismometer designs provided above, motion detection can occur along the horizontal (and in some cases vertical direction). For a comprehensive assessment it may be desirable to detect motion in multiple directions. To do so, any of the above seismometer designs may be combined into a single (multi-axes) system. See, for example, FIGS. 15 and 16. As shown in FIGS. 15 and 16, the systems can also be placed inside an enclosure. The enclosure can be evacuated to create a vacuum—which is useful to minimize damping and increase the quality (Q) factor of the PDL trap oscillator (see above).

As shown for instance in FIG. 15 (top view), with a two-axes system two of the present PDL trap seismometers are placed orthogonal to one another on a horizontal plane. In the example shown, the top PDL trap has its long axis parallel to the y-direction and the bottom PDL trap has its long axis parallel to the x-direction. Arrows are used to show the direction of the travel of the rod in the trap in the manner described above. Thus, this system can be used to detect horizontal movement along the x- and y-axes.

Figure 16A:
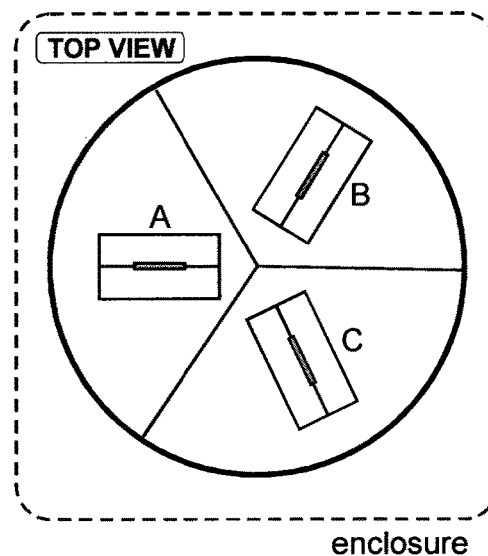
FIG. 16A is a top view diagram illustrating an exemplary three-axes system for detecting a seismic signal in multiple directions according to an embodiment of the present invention.
Figure 16B:
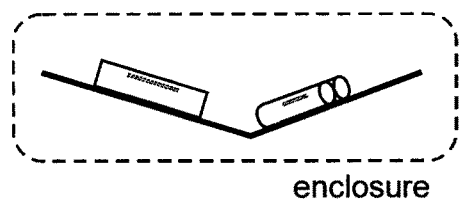
FIG. 16B is a side view diagram of the three-axes system according to an embodiment of the present invention.

An exemplary three-axes system is shown in FIG. 16A (top view) and FIG. 16B (side view). Here three PDL trap seismometers (A, B, and C) are employed. See FIG. 16A. As shown in FIG. 16B, a triple inclined plane design in used wherein the seismometers are placed at three inclined planes of the same inclination, e.g., an inclination angle $\theta_{INCLINATION}$ of from about 0.5 degrees to about 5 degrees, and ranges therebetween. The principal axes of the PDL trap are oriented at 120 degrees with respect to each other. The final three-axes seismic signal $S_x$, $S_y$, and $S_z$ can be calculated using linear combinations of the signals measured at the PDL traps A, B, and C.

Turning now to FIG. 17, a block diagram is shown of an apparatus 1700 for implementing one or more of the methodologies presented herein. For instance, according to an exemplary embodiment, the microcomputer in the above described sensing schemes may be embodied in apparatus 1700.

Apparatus 1700 includes a computer system 1710 and removable media 1750. Computer system 1710 includes a processor device 1720, a network interface 1725, a memory 1730, a media interface 1735 and an optional display 1740. Network interface 1725 allows computer system 1710 to connect to a network, while media interface 1735 allows computer system 1710 to interact with media, such as a hard drive or removable media 1750.

Processor device 1720 can be configured to implement the methods, steps, and functions disclosed herein. The memory 1730 could be distributed or local and the processor device 1720 could be distributed or singular. The memory 1730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1720. With this definition, information on a network, accessible through network interface 1725, is still within memory 1730 because the processor device 1720 can retrieve the information from the network. It should be noted that each distributed processor that makes up processor device 1720 generally contains its own addressable memory space. It should also be noted that some or all of computer system 1710 can be incorporated into an application-specific or general-use integrated circuit.

Optional display 1740 is any type of display suitable for interacting with a human user of apparatus 1700. Generally, display 1740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A seismometer, comprising:
    at least one parallel dipole line (PDL) trap having a pair of dipole line magnets, and a diamagnetic object levitating above the dipole line magnets; and
    a sensing system for determining a position of the diamagnetic object relative to the dipole line magnets, wherein the sensing system comprises at least one pair of electrodes enclosing but not touching the diamagnetic object.

2. The seismometer of claim 1, wherein the sensing system comprises:
    at least one first pair of electrodes;
    at least one second pair of electrodes, wherein the first pair of electrodes and the second pair of electrodes are present over opposite ends of the PDL trap; and
    resistors connecting the first pair of electrodes and the second pair of electrodes, wherein the resistors form a resistor-capacitor bridge with the first pair of electrodes and the second pair of electrodes.

3. The seismometer of claim 1, wherein the sensing system comprises:
    a light source on one side of the PDL trap; and
    photodetectors on another side of the PDL trap opposite the light source.

4. The seismometer of claim 3, wherein the light source is selected from the group consisting of: an incandescent light bulb, a light emitting diode, a laser, and combinations thereof.

5. The seismometer of claim 3, wherein the photodetectors are selected from the group consisting of: semiconductor photodetectors, light-dependent-resistors, and combinations thereof.

6. A method for sensing vibrations, the method comprising:
providing a seismometer comprising at least one PDL trap having a pair of dipole line magnets, and a diamagnetic object levitating above the dipole line magnets; and
determining a position of the diamagnetic object relative to the dipole line magnets, wherein displacement of the diamagnetic object in the PDL trap corresponds to a magnitude of the vibrations, wherein the seismometer further comprises a light source on one side of the PDL trap, photodetectors on another side of the PDL trap opposite the light source, and at least one first pair of electrodes and at least one second pair of electrodes over opposite ends of the PDL trap, the method further comprising:
detecting motion of the diamagnetic object relative to the dipole line magnets using the photodetectors;
determining a velocity of the diamagnetic object relative to the dipole line magnets using the photodetectors;
applying a bias voltage to the first pair of electrodes and the second pair of electrodes to serve as a counteracting force to stop the motion of the diamagnetic object; and
calculating force from the applied bias voltage as an output seismic signal.

7. The method of claim 6, further comprising:
illuminating the diamagnetic object using the light source;
reading a photocurrent signal from the photodetectors; and
calculating the displacement of the diamagnetic object using the photocurrent signal.

8. The method of claim 6, wherein the seismometer further comprises resistors connecting the first pair of electrodes and the second pair of electrodes, wherein the resistors form a resistor-capacitor bridge with the first pair of electrodes and the second pair of electrodes, the method further comprising:
applying a bias voltage to the first pair of electrodes and the second pair of electrodes and the pair of dipole line magnets;
measuring a bridge voltage between the first pair of electrodes and the second pair of electrodes using the resistor-capacitor bridge; and
determining the position of the diamagnetic object relative to the dipole line magnets using the bridge voltage.

* * * * *